US009410864B2

(12) United States Patent
Breitwieser et al.

(10) Patent No.: US 9,410,864 B2
(45) Date of Patent: Aug. 9, 2016

(54) METHOD AND DEVICE FOR DETERMINING THE STATIC UNBALANCE

(71) Applicant: Schenck RoTec GmbH, Darmstadt (DE)

(72) Inventors: Matthias Breitwieser, Gross-Umstadt (DE); Stephan Frese, Darmstadt (DE); Matthias Hartnagel, Einhausen (DE); Thomas Wanke, Gross-Umstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 514 days.

(21) Appl. No.: 14/071,751

(22) Filed: Nov. 5, 2013

(65) Prior Publication Data
US 2014/0123753 A1 May 8, 2014

(30) Foreign Application Priority Data

Nov. 6, 2012 (DE) .......................... 10 2012 110 621

(51) Int. Cl.
*G01M 1/00* (2006.01)
*G01M 1/12* (2006.01)

(52) U.S. Cl.
CPC ..................... *G01M 1/122* (2013.01)

(58) Field of Classification Search
CPC .................................................... G01M 1/122
USPC ............... 73/480, 482–486, 65.01, 65.09, 66; 29/737; 33/543, 550, 644; 360/98.08
See application file for complete search history.

(56) References Cited

U.S. PATENT DOCUMENTS

| 3,661,016 | A | * | 5/1972 | Dopp | G01M 1/02 73/462 |
| 3,754,447 | A | * | 8/1973 | Turton-Smith | G01M 1/28 73/457 |
| 3,805,623 | A | * | 4/1974 | Seghesio | G01R 13/208 73/459 |
| 3,813,948 | A | * | 6/1974 | Ito | G01M 1/20 73/460 |
| 3,862,570 | A | * | 1/1975 | Ongaro | G01M 17/022 73/146 |
| 4,428,225 | A | * | 1/1984 | Kato | G01M 1/12 73/483 |

(Continued)

FOREIGN PATENT DOCUMENTS

DE 34 19 546 A1 11/1985
DE 33 30 974 C2 7/1986

(Continued)

*Primary Examiner* — John Fitzgerald
*Assistant Examiner* — Truong Phan
(74) *Attorney, Agent, or Firm* — Collard & Roe, P.C.

(57) ABSTRACT

Disclosed is a method for determining the static unbalance of a body (30) provided with a locating surface (31) by means of a center-of-gravity weighing scale (10), the method including measuring the position of the locating surface (31) of the body (30) with respect to its mount by means of electric displacement sensors (16), computing from the measurement signals of the displacement sensors (16) the eccentricity of the locating surface (31) of the body (30) with respect to the reference point of the scale (10) by means of an electric evaluating circuit, weighing the body (30) and recording mass and position of the center of gravity of the body (30) with respect to the reference point of the scale (10), and computing the unbalance of the body (30) from the measurement signals of the scale (10) and the eccentricity of the locating surface (31) of the body (30) with respect to the reference point of the scale (10) by means of the evaluating circuit.

11 Claims, 2 Drawing Sheets

(56) References Cited

U.S. PATENT DOCUMENTS

| | | | |
|---|---|---|---|
| 4,691,567 A | 9/1987 | Himmler et al. | |
| 4,891,981 A * | 1/1990 | Schonfeld | G01M 1/16 73/460 |
| 5,099,430 A * | 3/1992 | Hirsch | F16F 15/31 464/180 |
| 6,178,063 B1 * | 1/2001 | Wood | G11B 17/038 360/98.07 |
| 6,971,154 B2 * | 12/2005 | Yoo | G11B 5/012 29/603.03 |
| 2007/0277606 A1 * | 12/2007 | Robbins | G01M 1/16 73/459 |
| 2011/0296686 A1 * | 12/2011 | Strother | F01D 5/027 29/889.2 |

FOREIGN PATENT DOCUMENTS

| | | |
|---|---|---|
| DE | 10 2009 016 123 A1 | 10/2010 |
| JP | 2012-026875 A | 2/2012 |

* cited by examiner

METHOD AND DEVICE FOR DETERMINING THE STATIC UNBALANCE

CROSS REFERENCE TO RELATED APPLICATIONS

Applicants claim priority under 35 U.S.C. §119 of German Application No. 10 2012 110 621.5 filed Nov. 6, 2012.

FIELD OF THE INVENTION

This invention relates to a method and a device for determining the static unbalance of a body provided with a locating surface by means of a weighing scale configured to determine the center of gravity of the body and including a mount for receiving the body and locating means centrally locating the body with respect to the reference point of the scale.

BACKGROUND OF THE INVENTION

A method and a device of the type referred to are known from DE 33 30 974 C2 and DE 10 2009 016 123 A1. In methods and devices of this type it is necessary to centrally locate the body under examination with respect to the scale's reference point with precise accuracy. When the locating surface of the body is formed by a bore it is known to clamp the body by means of a centering mandrel engaging the bore. In cases where relatively large and heavy bodies typically shaped in the form of disks are involved, an initial step includes a prior central locating operation when the body is placed on the support surface of the mount. In a subsequent step, the body is centrally re-located and clamped by means of an expanding arbor or a three-jaw chuck. The known locating means suffer from the disadvantage that clamping incurs the risk of damage to the locating surface. To minimize this risk, it would be necessary to adapt the clamping means to the various diameters of the clamping surface. Therefore, different clamping diameters require different clamping means needing to be exchanged in each instance. This adds to the complexity of construction and the cost of the device.

SUMMARY OF THE INVENTION

It is an object of the present invention to provide a method of the type initially referred to and a device for implementing the method, which enables an unbalance to be determined with a high repeat accuracy and reliably prevents any damage to the body to be measured due to clamping in its mount.

According to the invention, the method includes determining the static unbalance of a body provided with a locating surface by means of a weighing scale configured to determine the center of gravity of the body and including a mount for receiving the body and locating means guiding the body on its seating engagement with the mount to an essentially centered position with respect to the reference point of the scale, comprising the steps: Placing the body on the mount of the weighing scale, measuring the position of the locating surface of the body with respect to the mount by means of at least two electric displacement sensors spaced from each other at a defined angular distance, calculating the eccentricity of the locating surface of the body with respect to the reference point of the scale from the measurement signals of the displacement sensors by means of an electric evaluating circuit connected to the displacement sensors, weighing the body and recording mass and position of the center of gravity of the body with respect to the reference point of the scale, computing by means of the evaluating circuit the unbalance of the body using the measurement signals obtained from the scale and the eccentricity of the locating surface of the body with respect to the reference point of the scale.

In the method of the invention, an accurately centered positioning of the body with respect to the reference point of the scale is dispensed with by accepting an inaccurate positioning of the body when seated on its mount. Instead and in contrast to the known methods, the accurate position of the locating surface is measured by means of displacement sensors, the unbalance determination taking into account and compensating for any existing eccentricity of the center of the locating surface with respect to the reference point of the scale. In this manner, unbalance is determined precisely with a high repeat accuracy.

To perform the measurement, it is only necessary to pre-position the body before placing it on its mount. It is then no longer moved. Since pre-positioning requires only low guiding forces and obviates the need to apply high pressure forces for clamping on the locating surface, the risk of damage to the rotor is practically nil.

Another advantage of the method of the invention resides in a short process time. The displacement sensors are capable of detecting the position of the locating surface very rapidly and require less time than the displacement of the body to the measurement position by means of clamping fixtures. The repeat accuracy of the position measurement depends only on the accuracy of the displacement sensors and allows higher accuracies than those achievable with a three-jaw chuck.

To calibrate the displacement sensors, a further proposal of the invention includes measuring, by means of the displacement sensors, the position of a rotationally symmetrical calibrating body placed on the mount and defining the center of the calibrating body as the origin of a sensor coordinate system allocated to the displacement sensors. Subsequently, the calibrating body is weighed by means of the scale to determine a vector describing the eccentricity of the sensor coordinate system with respect to a scale coordinate system having its origin in the reference point of the scale. This calibrating method is a simple and speedy process and ensures an accurate calibration of the scale.

According to another proposal of the invention, the eccentricity of the locating surface of the body whose unbalance is to be determined with respect to the reference point of the scale can be readily determined by calculating, from the measurement signals of the displacement sensors, the position of the center of the locating surface of the body and a vector describing the eccentricity of the center of the locating surface with respect to the origin of the sensor coordinate system, and by calculating a vector describing the eccentricity of the center of the locating surface with respect to the reference point of the scale by adding the computed vector and the vector, obtained by prior calibration, of the eccentricity of the sensor coordinate system with respect to the origin of the scale coordinate system.

To determine the unbalance of the body, it is possible to measure by means of the scale a vector describing the eccentricity of the center of gravity of the body with respect to the scale coordinate system and, by subtracting this vector and the vector describing the eccentricity of the locating surface with respect to the scale coordinate system, to calculate a vector which describes the eccentricity of the center of gravity with respect to the center of the locating surface of the body. Using the eccentricity of the center of gravity of the body and its mass it is then possible to compute its static unbalance in known manner.

In the method of the invention, the displacement sensors employed may be contactless sensors or sensors having movable tactile elements. In cases where displacement sensors with tactile elements are used, these may affect the unbalance measurement because the tactile elements, in probing the position of the locating surface, are moved and displaced relative to the scale mount. To prevent such an adverse effect on the unbalance measurement, it is possible according to the invention to determine the movable mass of each tactile element and to compute for each tactile element an unbalance component from the mass and the displacement travel of the respective tactile element as given by the measurement signal. The unbalance components computed may then be deducted from the body's unbalance computed from the position of the center of gravity.

An advantageous device for implementing the method comprises according to the present invention a weighing scale configured to determine the center of gravity of the body and including a mount for receiving the body and locating means guiding the body on its being seated on the mount to an essentially centered position with respect to the reference point of the scale, said mount including at least two electric displacement sensors spaced from each other at a defined angular distance, which measure the position of the locating surface of the body with respect to the mount and are connected to an electric evaluating circuit configured to compute the eccentricity of the locating surface of the body with respect to the reference point of the scale from the measurement signals of the displacement sensors, and to compute the center of gravity and the unbalance of the body with respect to the center of its locating surface from measurement signals of the scale obtained by weighing the body and from the computed eccentricity of the locating surface.

The device of the invention may be implemented economically using simple mechanical components because the need to take up and generate high process forces is obviated. The device also enables various diameters of the locating surface to be accommodated by enabling the displacement sensors to be adjusted radially. Upon an adjustment it is only necessary to re-calibrate the displacement sensors with respect to the center. This can be performed in simple manner using a calibrating ring.

Preferably, the device includes displacement sensors having movable tactile elements adapted to make engagement with the locating surface of the body, with the evaluating circuit being configured to compute from the mass and the displacement travel of each tactile element an unbalance component and to deduct the computed unbalance components from the computed unbalance of the body. A position change of the tactile elements therefore does not affect the unbalance determination.

According to the present invention, the mount of the device may include a dish in the form of circular disk on which the displacement sensors are arranged equidistantly from the center of the dish and at an angular relative distance of 120°. The tactile elements of the displacement sensors may be movable radially by hand or by means of a drivable actuator.

The mount for the body to be measured may include mounting elements which project from the dish and are arranged between the displacement sensors and have support surfaces for the body which lie in a common plane.

To guide the body to an essentially centered position, the mount may be provided with at least three conical guide elements which protrude from the plane of the support surfaces and are configured to guide the body on the locating surface. To accommodate various diameters of the locating surface, the guide elements may be radially adjustable.

BRIEF DESCRIPTION OF THE DRAWINGS

The present invention will be explained in more detail in the following with reference to an embodiment illustrated in the accompanying drawing. In the drawing.

DETAILED DESCRIPTION OF THE DRAWINGS

Figure 1:
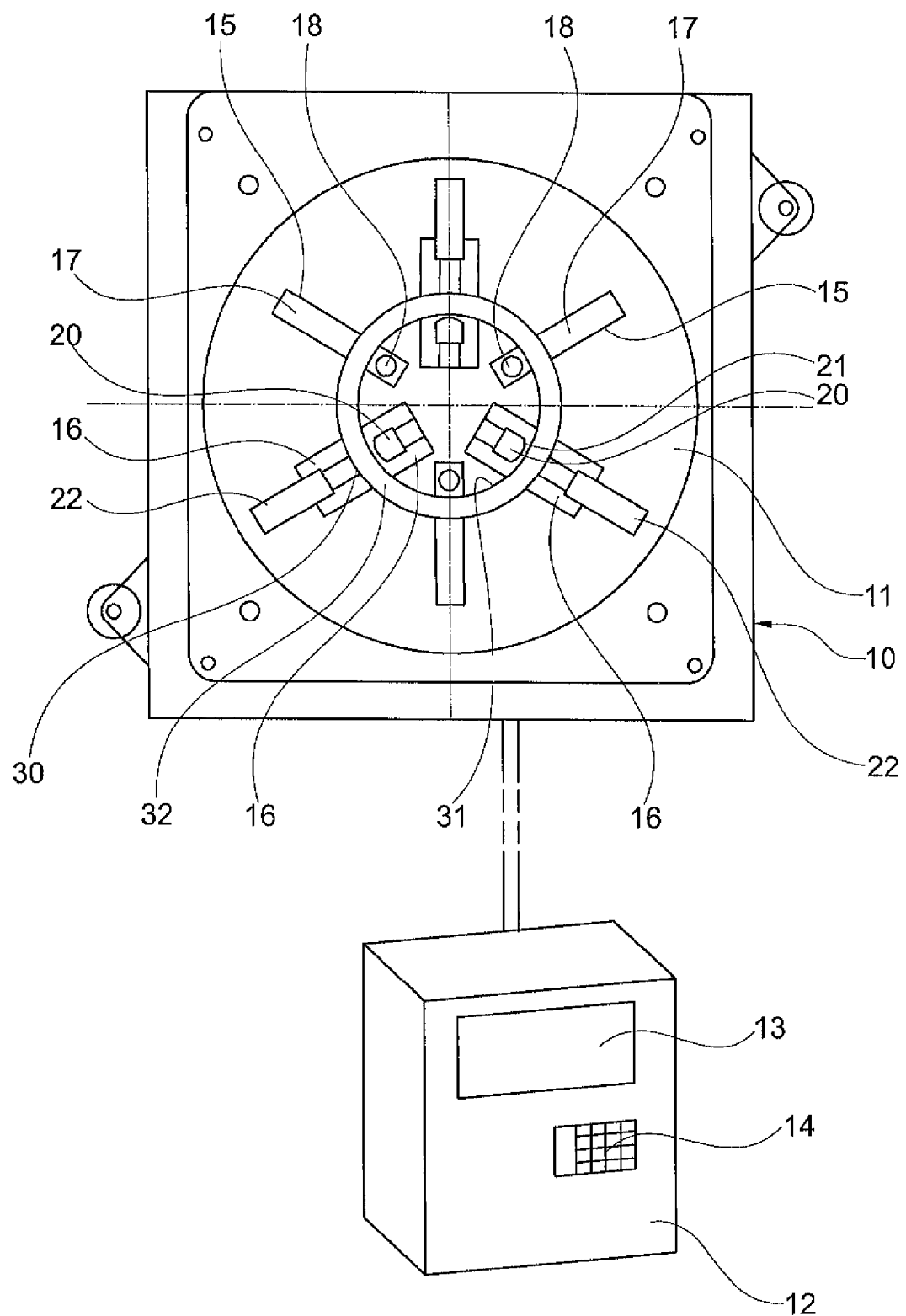
FIG. 1 is a top plan view of a center-of-gravity scale according to the invention.

FIG. 1 shows a weighing scale 10 to determine the unbalance of a body configured to rotate about an axis by weighing the body and measuring the position of its center of gravity. The scale 10 has an accommodating dish 11 in the form of a plane circular disk. The dish 11 has two degrees of freedom and is supported in vertical direction on at least three force sensors situated under the dish and issuing analog or digital electric measurement signals. The measurement signals are transmitted to an evaluating circuit 12 including a screen 13 for display of the unbalance data determined and a keyboard 14 for data input. Arranged on the dish 11 in a radial configuration are mounting elements 15 and displacement sensors 16. Two displacement sensors spaced, for example, at a relative distance of 90°, would be generally sufficient. Three displacement sensors however increase the accuracy of the position measurement.

The mounting elements 15 are arranged at a center-to-center distance of 120°. The displacement sensors 16 are arranged between the mounting elements 15 and spaced from these at a center-to-distance of 60°. On their upper sides the mounting elements 15 define support surfaces 17 which lie in a common plane, arranged parallel and spaced from the dish 11. Fitted to the mounting elements 15 are pin-shaped guide elements 18 which protrude upwardly beyond the plane of the support surfaces 17 and are of a conical, upwardly tapering configuration. The guide elements 18 are equidistantly spaced from the center axis of the dish 11 and serve to centrally locate the body seated on the mounting elements.

The displacement sensors 16 extend underneath the common plane of the support surfaces 17. They include tactile elements 20 protruding upwardly beyond the plane of the support surfaces 17 and having radially outer tactile surfaces 21 suitably formed and intended for engagement with a bore surface of a body resting on the mounting elements 15. The tactile elements 20 are mounted for radial movement in a sliding guideway of the displacement sensors 16 and are movable by means of electric actuators 22. Control of the actuators 22 is by means of the evaluating device 12. The respective positions of the tactile elements 20 and the amount of their radial movement are measurable by means of displacement transducers arranged on the displacement sensors 16. The measurement results of the displacement sensors 16 are transmitted to the evaluating circuit 12.

Seated on the scale 10 is, by way of example, a body 30 whose unbalance is to be measured. The body 30 is symmetrical about the axis and includes a locating surface 31 which in the chosen example is defined by the wall of a cylindrical bore of the body 30. The body 30 has at its axial ends plane end surfaces 32 lying in planes normal to the axis of the locating surface 31. With its lower end surface 32 the body 30 rests on the support surfaces 17 of the mounting elements 15. The guide elements 18 guide the body 30 on the locating surface 31 as it is placed on its mount, thereby locating it essentially centrally relative to the dish 11. Central location is however inaccurate because the guide elements 18 are spaced such a distance from the axis of the dish 11 as to enable the body 30 to be placed on the scale 10 easily and without incurring the risk of damage, as by jamming.

Once the body 30 is seated, the actuators 22 are driven to cause a low force to be applied for movement of the tactile elements 20 with their tactile surfaces 21 into engagement with the locating surface 31. The body 30 is not moved in the process and maintains its seated position unchanged.

Using the measurement signals of the displacement sensors 16 by comparing them with prior obtained calibration data stored in the evaluating circuit 12, the deviation of the position of the body 30 from an accurately centered position and from the reference point of the scale 10 is calculated and compensated for in the unbalance determination.

Figure 2:
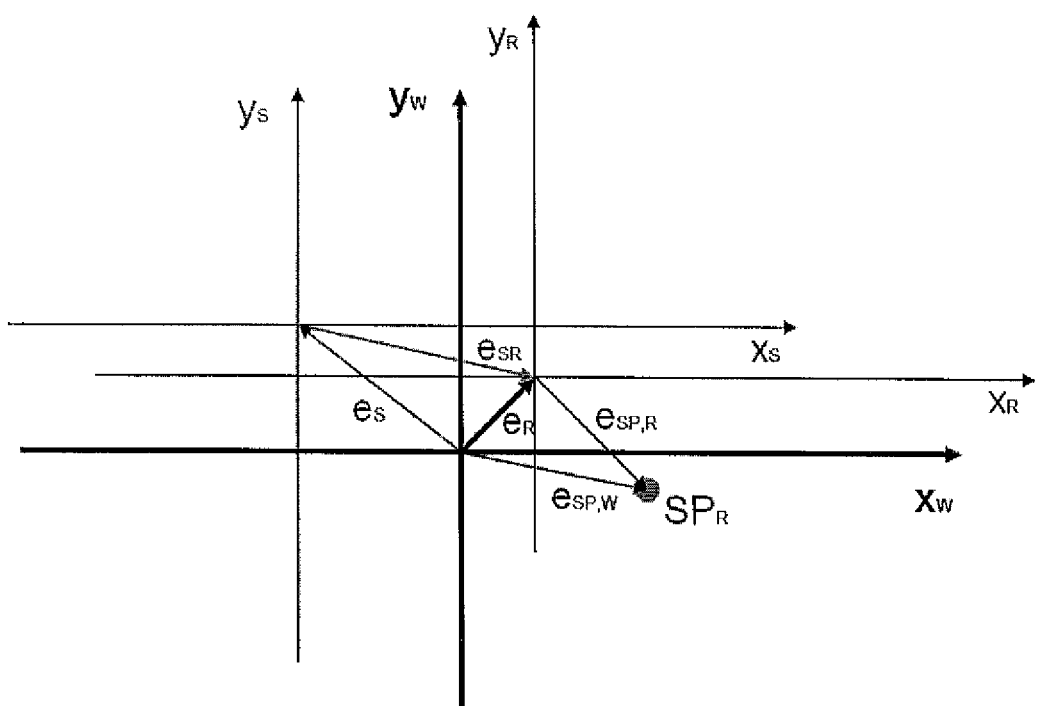
FIG. 2 is a view of coordinate systems to explain the method of the invention.

The calculation will be explained in greater detail in the following with reference to the coordinate systems illustrated in FIG. 2. In FIG. 2, W designates the scale coordinate system having its origin in the reference point of the scale 10, S designates the sensor coordinate system having its origin in the center of the displacement sensors 16, and R is the body coordinate system with its origin in the center of the locating surface 31 of the body 30. The reference point of the scale 10 and the center of the displacement sensors 16 are determined by a calibrating process using a calibrating body by means of compensation by turning it through 180 degrees, which includes calibrating the displacement sensors 16 with respect to the center of the calibrating body and determining, by weighing, a vector $e_S$ which describes the eccentricity of the sensor coordinate system S with respect to the scale coordinate system W.

To determine the unbalance of the body 30, the center of the locating surface 31 is initially calculated from the measurement signals of the displacement sensors 16 which are indicative of the displacement of the tactile elements 20 relative to the zero-point position obtained by calibration, followed by calculation of a vector $e_{SR}$ indicative of the eccentricity of the center of the locating surface 31 with respect to the origin of the sensor coordinate system S. By adding the vector $e_{SR}$ and the vector $e_S$ obtained by calibration and stored, a vector $e_R$ is computed which is indicative of the eccentricity of the center of the locating surface 31 of the body 30 with respect to the origin of the scale coordinate system W.

The position of the center of gravity $SP_R$ of the body 30 with respect to the scale coordinate system W can be determined in conventional manner from the measurement signals of the scale 10 and described by a vector $e_{SP,W}$. The vector $e_{SP,W}$ required for unbalance calculation in the body coordinate system R related to the center of the locating surface 31 can then be calculated by subtracting the vectors $e_{SP,W}$ and $e_R$. The calculated vector $e_{SP,R}$ indicates the eccentricity of the center of gravity of the body 30. Magnitude and angular position of the unbalance of the body 30 can then be calculated in known manner from the eccentricity of the center of gravity and the mass of the body 30.

Unbalance calculation also takes into account that the displacement of the tactile elements 20 on engagement with the locating surface 31 affects the measured unbalance. For each displacement sensor 16 an unbalance component is calculated from the mass of the displaceable tactile elements 20 and the displacement travels obtainable from the measurement signals of the displacement sensors 16, which component has to be deducted from the unbalance calculated from the eccentricity of the center of gravity and the mass of the body 30 in order to obtain the true unbalance of the body 30.

The method and the device of the present invention are suitable for all known applications of center-of-gravity scales for unbalance determination. The range of applications can be widened still further with regard to size and weight of the bodies to be measured, because it is not necessary for a more accurately centered location to move the body when seated on its mount. Nor is the application limited to concave locating surfaces but is equally suited to convex locating surfaces. To accommodate various diameters, the displacement sensors and the support elements may be arranged on the dish in a radially displaceable or offsettable manner. Instead of electromechanical displacement sensors, optical and contactless displacement sensors may also find application.

What is claimed is:

1. A method for determining the static unbalance of a body provided with a locating surface by means of a weighing scale configured to determine the center of gravity of the body and including a mount capable of receiving the body with a vertically aligned axis of rotation, and locating means guiding the body on its seating engagement with the mount to an essentially centered position with respect to a reference point of the scale, comprising the steps:

placing the body on the mount of the weighing scale, measuring the position of the locating surface of the body with respect to the mount by means of at least two electric displacement sensors spaced from each other at a defined angular distance, calculating the eccentricity of the locating surface of the body with respect to the reference point of the scale from measurement signals of the displacement sensors by means of an electric evaluating circuit connected to the displacement sensors, weighing the body and recording mass and position of the center of gravity of the body with respect to the reference point of the scale, computing by means of the evaluating circuit the unbalance of the body using measurement signals obtained from the scale and the eccentricity of the locating surface of the body with respect to the reference point of the scale.

2. The method according to claim 1, further comprising employing displacement sensors which have movable tactile elements adapted to make engagement with the locating surface of the body, by determining the movable mass of each tactile element, and by calculating for each tactile element an unbalance component from the mass and the displacement travel of the individual tactile elements as given by the measurement signal, and by deducting the calculated unbalance components from the unbalance of the body computed from the eccentricity of the center of gravity.

3. The method according to claim 1, further comprising measuring for calibration the position of a rotationally symmetrical calibrating body placed on the mount by means of the displacement sensors and defining the center of the calibrating body as the origin of a sensor coordinate system allocated to the displacement sensors, and by weighing the calibrating body by means of the scale to determine a vector which describes the eccentricity of the sensor coordinate system with respect to a scale coordinate system having its origin in the reference point of the scale.

4. The method according to claim 3, further comprising calculating, from the measurement signals of the displacement sensors, the position of the center of the locating surface of the body and a vector describing the eccentricity of the center of the locating surface with respect to the origin of the sensor coordinate system, and calculating, by adding the vector of the eccentricity of the center of the locating surface and the vector of the eccentricity of the sensor coordinate system with respect to the origin of the scale coordinate system, a vector which describes the eccentricity of the center of the locating surface of the body with respect to the reference point of the scale.

5. The method according to claim 4, further comprising measuring by means of the scale the vector of the eccentricity of the center of gravity of the body with respect to the scale coordinate system, and calculating, by subtracting the vector of the eccentricity of the center of gravity of the body and the vector of the eccentricity of the locating surface of the body with respect to the scale coordinate system, a vector which describes the eccentricity of the center of gravity with respect to the center of the locating surface, and by calculating the unbalance of the body from the eccentricity of the center of gravity with respect to the center of the locating surface and the mass of the body.

6. A device for determining the static unbalance of a body provided with a locating surface, comprising a weighing scale configured to determine the center of gravity of the body and including a mount adapted to receive the body with a vertically aligned axis of rotation, and locating means guiding the body on its being seated on the mount to an essentially centered position with respect to a reference point of the scale, said mount including at least two electric displacement sensors spaced from each other at a defined angular distance, which measure the position of the locating surface of the body with respect to the mount, said displacement sensors being connected to an electric evaluating circuit configured to compute the eccentricity of the locating surface of the body with respect to the reference point of the scale from measurement signals of the displacement sensors, and to compute the center of gravity and the unbalance of the body from measurement signals of the scale obtained by weighing the body and from the computed eccentricity of the locating surface.

7. The device according to claim 6, wherein each of the displacement sensors includes a movable tactile element adapted to make engagement with the locating surface of the body, and that the evaluating circuit is configured to compute from the mass and the displacement travel of each tactile element an unbalance component and to deduct the computed unbalance components from the computed unbalance of the body.

8. The device according to claim 7, wherein the tactile element of the displacement sensor is movable radially by hand or by means of a drivable actuator.

9. The device according to claim 6, wherein the mount includes a dish in the form of a circular disk on which the displacement sensors are arranged equidistantly from the center of the dish and at an angular relative distance of 120°.

10. The device according to claim 9, wherein the mount includes mounting element which are arranged on the dish between the displacement sensors and have support surfaces for the body which lie in a common plane.

11. The device according to claim 10, wherein the mount includes at least three conical guide elements which protrude from the plane of the support surfaces and are configured to guide the body on the locating surface to the essentially centered position with respect to the reference point of the scale.

\* \* \* \* \*